United States Patent Office 3,106,456
Patented Oct. 8, 1963

3,106,456
PROCESS FOR THE PRODUCTION OF REACTIVE REFRACTORY METAL CARBIDES
Robert L. Ripley, Lockport, N.Y., assignor to Union Carbide Corporation, a corporation of New York
No Drawing. Filed Apr. 7, 1960, Ser. No. 20,537
14 Claims. (Cl. 23—208)

The present invention relates to a method of preparing carbides of the reactive refractory metals, titanium, zirconium, hafnium, tantalum, columbium, and vanadium.

Heretofore, carbides of reactive refractory metals have been commercially prepared by reacting an oxide of a reactive refractory metal with carbon at temperatures of about 2000° C. and higher, usually under vacuum. Besides the high reaction temperature required and the considerably high vacuum, an excess of carbon is needed in order to obtain a product which is satisfactorily low in oxygen. The necessity of extra carbon causes a stoichiomertically unbalanced reaction which, because of the high temperature employed, results in a carbide containing large amounts of uncombined (free) carbon, ranging at least from 0.5 to 1.0 percent by weight, and often greater than 1 percent by weight. Such free carbon is a very undesirable constituent in any reactive refractory metal carbide, because, among other things, it renders the carbide considerably friable.

Another heretofore known method of preparing reactive refractory metal carbides employs calcium carbide as the reducing agent. Specifically, it comprises the reaction by fusion at temperatures of approximately 3000° C. of an oxide of a reactive refractory metal with carbon and calcium carbide. However, besides requiring very high temperature, this reaction has the disadvantage of producing a carbide of commercially undesirably large particle size requiring subsequent grinding operations to reduce it to a usable and desirable size.

It is, accordingly, an object of the present invention to provide a low temperature process for preparing carbides of reactive refractory metals, having a low content of uncombined carbon.

Another object of this invention is to provide a method for the preparation of reactive refractory metal carbides which are of very small particle size. Other objects and advantages of the present invention will be apparent from the following description and from the appended claims.

Briefly stated, the process which satisfies the objects of the present invention comprises admixing a finely-divided reactive refractory metal with a finely-divided calcium carbide chemical equivalent in at least stoichiometric proportions for the conversion of the reactive refractory metal to the carbide heating the mixture of reactive refractory metal and calcium carbide chemical equivalent to temperatures ranging from about 1200° C. to about the decomposition temperature of calcium carbide and, leaching the reactive refractory metal carbide so produced to remove therefrom any calcium formed during the reaction as well as any excess calcium carbide.

As employed herein, the term "chemical equivalent of calcium carbide" is used to define a reactant having the carbon and the calcium components in stoichiometric proportions. Thus, the reactant employed may be calcium carbide, or it may be a mixture of comminuted carbon and calcium in their elemental form, or it may be a combination of elemental carbon and calcium in a nonadmixed condition, provided the atomic ratio of carbon to calcium is about two.

The reactive refractory metal carbide resulting from the reaction of a reactive refractory metal with the calcium carbide equivalent possesses a particle size substantially equal to the particle size of the metal originally used in the reaction. The carbon combined with the metal to form the respective carbide is very close to the theoretical stoichiometric value because an excess of carburizing agent may be added to the reaction mixture without incurring undesirable increases of the free carbon content in the carbide product. A higher purity carbonizing agent, although preferable, is not, from a commercial standpoint, necessary.

The coarsest, economically acceptable particle size of the refractory metal employed in the process is approximately 100 mesh, while the respective coarsest, economically acceptable particle size of the carburizing agent is about 65 mesh, all mesh sizes being expressed as United States sieve mesh sizes.

If larger particle sizes than stated hereabove are employed, the time necessary to bring the reaction to satisfactory completion is increased considerably, thus rendering the process relatively slow and commercially impractical and uneconomical.

By virtue of the relatively low temperatures required by the reaction, namely, from about 1200° C. to about 1500° C., any suitable heat-resistant steel vessel may be employed, thus rendering the process very desirable since no special, high-temperature, expensive container is rendered mandatory.

Chemically unreactive atmospheres are desirably employed in the process; these may consist of argon, helium and/or other rare gases of the process may be effected in vacuo; however, it has been found that atmospheres of carbon dioxide and/or nitrogen are not desirable, because of their deleterious effects on the carbides produced.

Although not necessary, a slight amount of calcium carbide in excess of the stoichiometric quantity required by the reaction has been found to be oftentimes convenient. The reaction time may vary considerably since it can be properly stated to be a function of the particle size to which the refractory metal and the carburizing agent are comminuted, of the degree of compacting and admixing of the starting materials, and also a function of the temperature employed. As it was stated previously, a temperature of from about 1200° C. to about the decomposition temperature of calcium carbide should be employed for the reaction. The temperature should be maintained below the decomposition temperature of calcium carbide, which is approximately 1500° C., since at this temperature metallic calcium may be distilled from the carburizing agent. However, temperatures ranging from about 1250° C. to about 1350° C. are preferred.

At the conclusion of the reaction, the reaction mass is cooled. The reaction product, which comprises reactive refractory metal carbide elemental calcium, and any excess of calcium carbide equivalent, is leached with an aqueous solution of an acid whose anion produces a soluble calcium salt, so as to ensure complete removal of the calcium. Suitable acids which may be employed in the aqueous solution are, for example, hydrochloric acid, nitric acid, and acetic acid. Leaching solutions having pH values as high as about seven may be satisfactorily employed. However, the leaching solution should preferably be maintained at a relatively low pH value, for example, not greater than 1.5. A more rapid removal of the calcium by-product and of any unreacted calcium carbide is thus achieved, since the speed of removal of such substances is mainly a function of the acidity of the leaching solution.

To better describe the process of the invention, the following examples are set forth, with the understanding that they should be considered merely as illustrative of and not limitative upon the scope of the invention.

*Example I*

A mixture comprising 7.4 grams of titanium metal comminuted to minus 100 mesh particle size and 12.6 grams of commercial calcium carbide comminuted to minus 65 mesh particle size was prepared. The mixture was placed in a carbon crucible, and the air was removed therefrom and replaced with an atmosphere of argon. The crucible was heated to approximately 1200° C. and maintained at this temperature for a period of sixty minutes. At the end of the reaction, the crucible was evacuated to approximately 0.5 inch of argon pressure, in order to force the volatilization of the greatest portion of calcium produced and, therefore, to simplify and shorten the subsequent leaching operation. After the products were leached with dilute hydrochloric acid and analyzed, the titanium carbide produced was found to contain 77.23 percent by weight titanium, 18.67 percent by weight combined carbon, and 0.34 percent by weight free carbon, and to have maintained the particle size of the original refractory metal.

*Example II*

A mixture of 12 grams of titanium metal comminuted to minus 100 mesh particle size and 6 grams of high-purity, finely-divided graphite was prepared and placed in a stainless steel crucible on top of 10.1 grams of granular elemental calcium. The air present in the stainless steel crucible was replaced with an atmosphere of argon. The crucible was subsequently heated to 1265° C. and maintained at this temperature for a period of sixty minutes. After cooling to room temperature, the products were leached with dilute hydrochloric acid and an analysis of the carbide produced showed that the product contained 80.12 percent by weight titanium, 18.83 percent by weight combined carbon, and 0.07 percent by weight free carbon. The product retained the particle size of the original refractory metal.

What is claimed is:

1. A process for the preparation of reactive refractory metal carbides, which comprises admixing finely divided metal particles of a reactive refractory metal selected from the group consisting of titanium, zirconium, hafnium, tantalum, columbium and vanadium with at least a stoichiometric amount of a chemical equivalent of finely divided calcium carbide; heating said mixture of reactive refractory metal and calcium carbide equivalent to a temperature of from about 1200° C. to about below the decomposition temperature of calcium carbide; and leaching the reaction product to remove therefrom elemental calcium and excess calcium carbide equivalent.

2. The process in accordance with claim 1 in which the reactive refractory metal is comminuted to a particle size less than 100 mesh and the calcium carbide equivalent is comminuted to a particle size less than 65 mesh.

3. The process in accordance with claim 1 in which the reactive refractory metal and the calcium carbide equivalent are heated to a temperature of from about 1250° C. to about 1350° C.

4. The process in accordance with claim 1 in which the leaching is performed by using an aqueous solution of an acid selected from the group consisting of hydrochloric acid, nitric acid and acetic acid.

5. The process in accordance with claim 1 in which the leaching solution has a maximum pH of about 1.5.

6. A process for the preparation of reactive refractory metal carbides, which comprises admixing metal particles of a reactive refractory metal having a particle size less than 100 mesh and selected from the group consisting of titanium, zirconium, hafnium, tantalum, columbium and vanadium with at least a stoichiometric amount of a chemical equivalent of calcium carbide comminuted to a particle size less than 65 mesh; heating said mixture of comminuted reactive refractory metal and comminuted calcium carbide equivalent to a temperature of from about 1250° C. to about 1350° C.; and leaching the reaction product with an aqueous solution of an acid selected from the group consisting of hydrochloric acid, nitric acid and acetic acid, said leaching solution having a maximum pH of about 1.5, to remove from said reaction product elemental calcium and excess calcium carbide equivalent.

7. A process for the preparation of reactive refractory metal carbides, which comprises admixing finely divided metal particles of a reactive refractory metal selected from the group consisting of titanium, zirconium, hafnium, tantalum, columbium and vanadium with at least a stoichiometric amount of calcium carbide equivalent in the form of finely divided elemental carbon and finely divided elemental calcium; heating said mixture of reactive refractory metal, elemental carbon and elemental calcium to a temperature of from about 1200° C. to about below the decomposition temperature of calcium carbide; and leaching the reaction product to remove therefrom elemental calcium and excess calcium carbide.

8. The process in accordance with claim 7 in which the reactive refractory metal is comminuted to a particle size less than 100 mesh and the elemental carbon is comminuted to a particle size less than 65 mesh.

9. The process in accordance with claim 7 in which the reactive refractory metal, elemental carbon and elemental calcium are heated to a temperature of from about 1250° C. to about 1350° C.

10. The process in accordance with claim 7 in which the leaching is performed by using an aqueous solution of an acid selected from the group consisting of hydrochloric acid, nitric acid and acetic acid.

11. A process in accordance with claim 7 in which the leaching solution has a maximum pH of about 1.5.

12. A process for the preparation of reactive refractory metal carbides, which comprises admixing metal particles of a reactive refractory metal having a particle size less than 100 mesh and selected from the group consisting of titanium, zirconium, hafnium, tantalum, columbium and vanadium with at least stoichiometric amounts of calcium carbide equivalent in the form of elemental calcium and elemental carbon comminuted to a particle size less than 65 mesh; heating said mixture of comminuted reactive refractory metal and comminuted elemental carbon and elemental calcium to a temperature of from about 1250° C. to about 1350° C.; and leaching the reaction product with an aqueous solution of an acid selected from the group consisting of hydrochloric acid, nitric acid and acetic acid, said leaching solution having a maximum pH of about 1.5, to remove from said reaction product elemental calcium and excess calcium carbide.

13. A process for the preparation of titanium carbide which comprises admixing particles of titanium metal having a particle size less than 100 mesh with a substantially stoichiometric amount of calcium carbide comminuted to a particle size less than 65 mesh; heating said mixture of comminuted titanium metal and calcium carbide in an argon atmosphere to a temperature of about 1200° C.; and leaching the reaction product with an aqueous solution of hydrochloric acid and at a pH of about 1.5.

14. A process for the preparation of titanium carbide which comprises admixing particles of titanium metal having a particle size less than 100 mesh with a substantially stoichiometric amount of calcium carbide equivalent in the form of graphite comminuted to a particle size less than 65 mesh and elemental calcium; heating said mixture of comminuted titanium metal, graphite and elemental calcium in an argon atmosphere to a temperature of about 1265° C.; and leaching the reaction product with an aqueous solution of hydrochloric acid and at a pH of about 1.5.

References Cited in the file of this patent

UNITED STATES PATENTS

| | | |
|---|---|---|
| 2,124,509 | McKenna | July 19, 1938 |
| 2,155,682 | Ridgway | Apr. 25, 1939 |
| 2,532,295 | Gardner | Dec. 5, 1950 |
| 2,972,530 | Zimmerley et al. | Feb. 21, 1961 |

OTHER REFERENCES

Schwarzkopf and Kieffer: Refractory Hard Metals, The Macmillan Co. (1953), pages 108, 116–117.